Dec. 13, 1960     C. W. BRITCHER     2,963,994
DUSTING EQUIPMENT
Filed Sept. 28, 1956     4 Sheets-Sheet 1
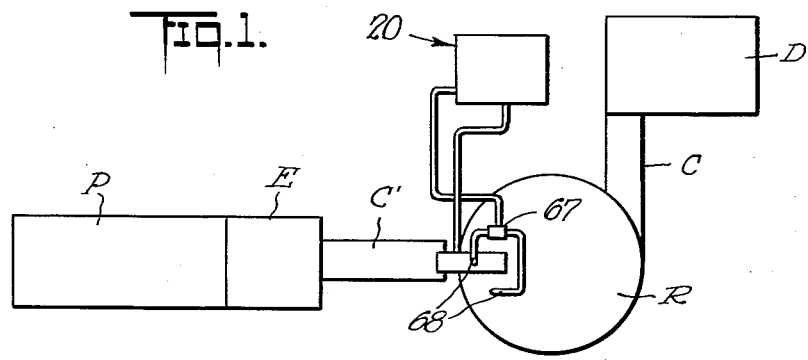
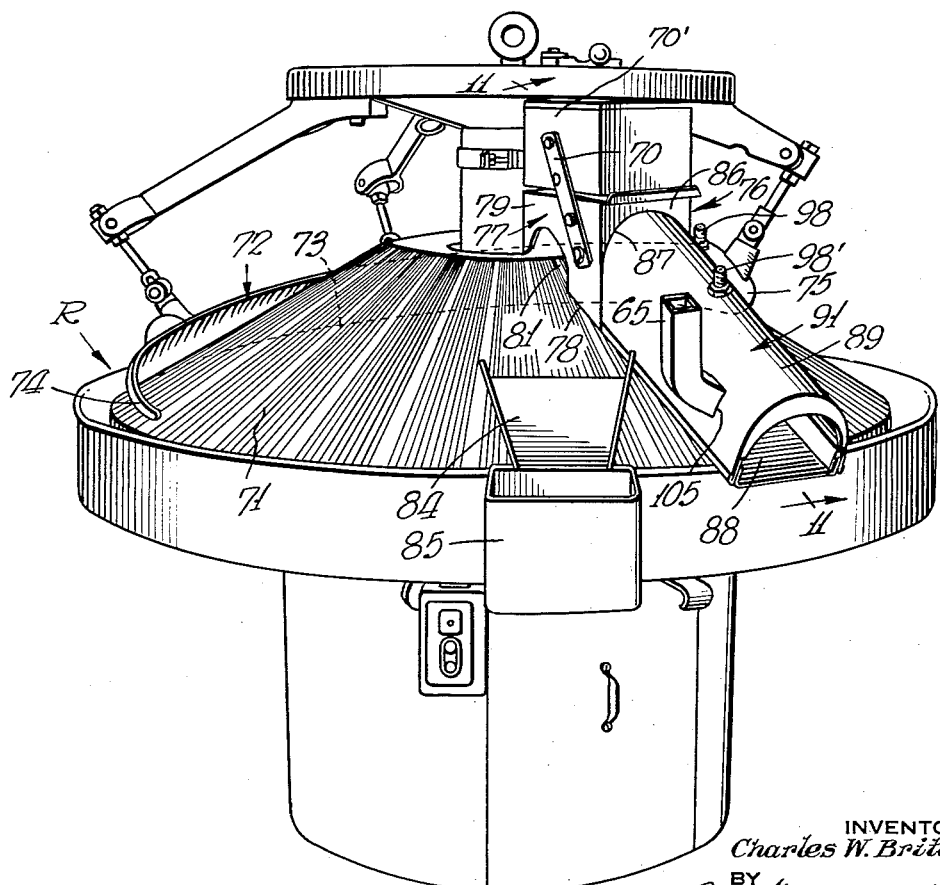
INVENTOR
Charles W. Britcher
BY
ATTORNEYS Dec. 13, 1960 C. W. BRITCHER 2,963,994
DUSTING EQUIPMENT Filed Sept. 28, 1956 4 Sheets-Sheet 2

INVENTOR
*Charles W. Britcher*
BY
*Dean Fairbank & Hirsch*
ATTORNEYS

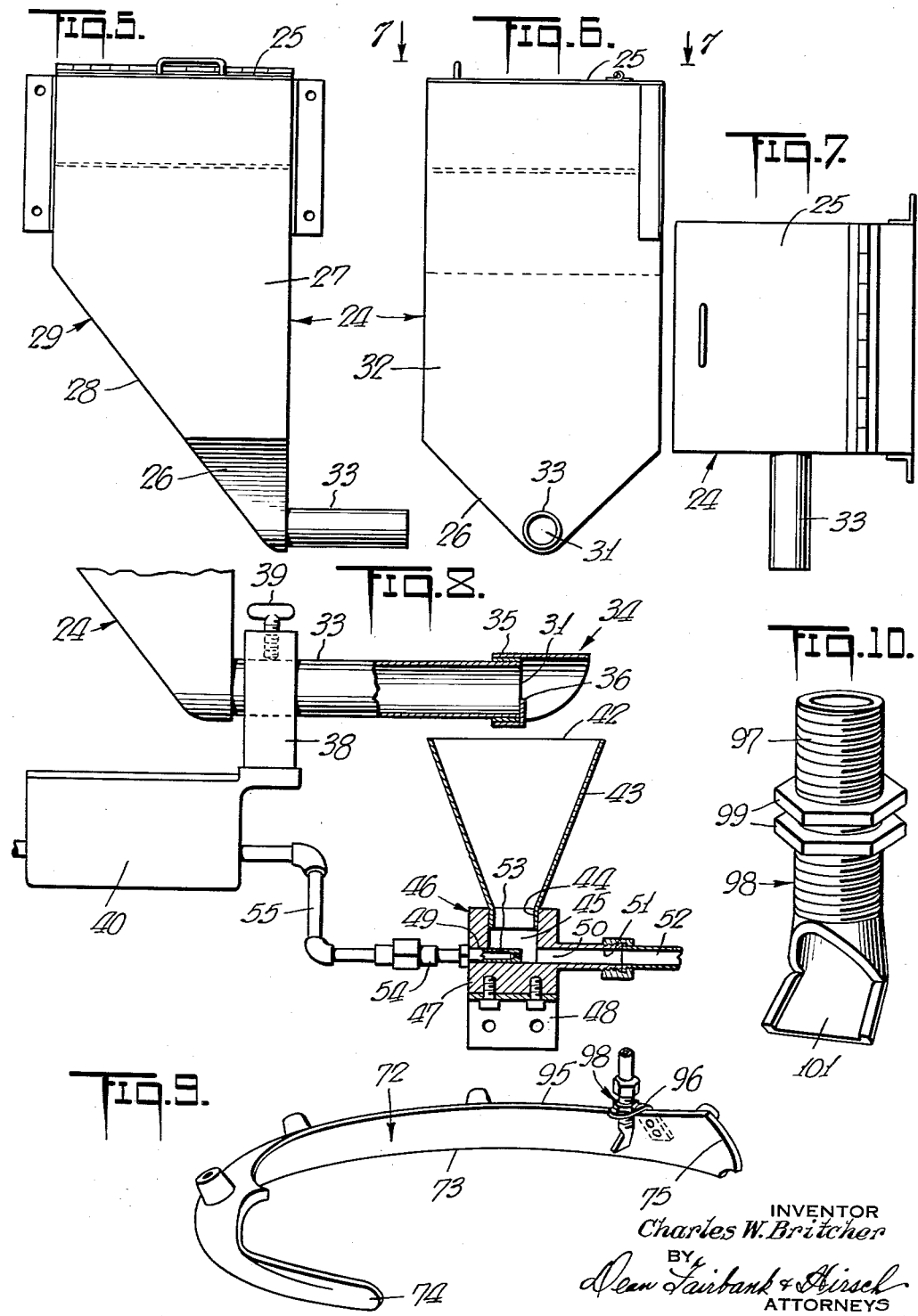

Dec. 13, 1960 C. W. BRITCHER 2,963,994
DUSTING EQUIPMENT
Filed Sept. 28, 1956 4 Sheets-Sheet 4
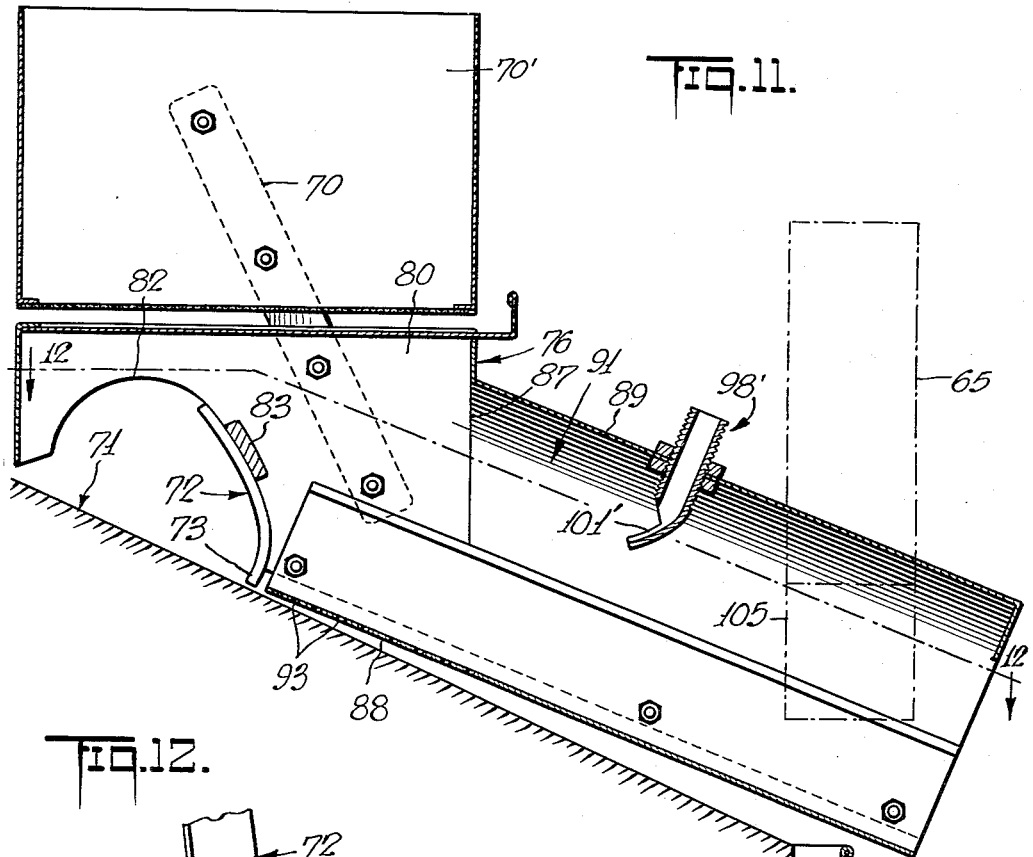
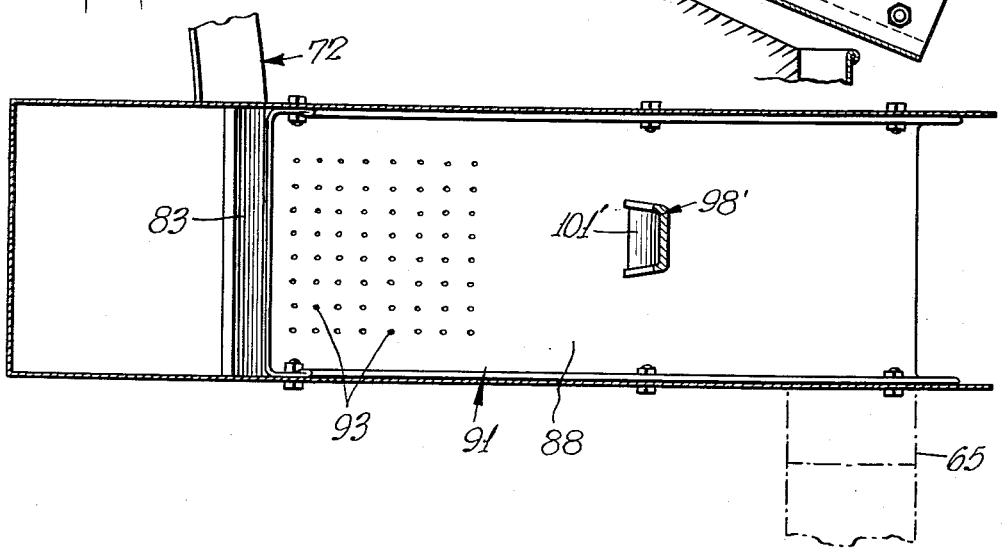
INVENTOR
*Charles W. Britcher*
BY
*Dean Fairbank & Hirsch*
ATTORNEYS

United States Patent Office 2,963,994
Patented Dec. 13, 1960

2,963,994

DUSTING EQUIPMENT

Charles W. Britcher, 65 High St., Glen Ridge, N.J., assignor to Herbert Cole Trust Filed Sept. 28, 1956, Ser. No. 612,621

12 Claims. (Cl. 107—9)

The present invention relates to the art of food manufacture, more particularly to the dusting of individual portions of food product, generally for the purpose of preventing adhesion while in moist or tacky condition in the course of processing, one important application being to the make-up procedure preparatory to entering the oven in the mass production of bakery products including bread of various types, rolls, biscuits, cakes and pies.

Where flour is used as the dusting medium in bakeries, since the flour readily mixes with the water in the dough, a relatively large amount of flour is required for each portion, especially for loose or wet dough, to assure the requisite dryness for preventing adhesion to the make-up equipment.

In addition to the use of such large quantities of flour being uneconomical, since a relatively large amount of the flour adheres to the relatively wet dough, as most of the moisture in the dough is subsequently evaporated in the baking oven, the flour used for dusting reverts substantially to raw flour, which accounts for swirls, cores and dust holes frequently appearing on the inside of the loaf or other bakery product and also results in objectionable dust marks on the crust.

Where excess powder accumulates in the proofer or other make-up equipment, frequent stoppage is required for cleaning with resultant inefficiency of the equipment.

Where powder escapes into the air and settles on the floor or on the equipment, such powder is wasted and in addition floating dust may cause respiratory disturbance.

As flour is subject to insect infestation, especially in the overhead proofer and also throughout the make-up department, the use of flour requires preventative sanitation measures such as the use of insecticides and fumigants, entailing the need for particular caution in food processing plants.

It is accordingly among the objects of the invention to provide a method and equipment that is simple, and not likely to become deranged, by which the dough pieces in their travel through make-up equipment, may be uniformly and adequately dusted with the use of powder in volume, but a small fraction of that required where flour is used, wherein the need for frequent cleaning is obviated, wherein there is no loss of dusting powder in the atmosphere, and consequently no respiratory difficulty and no waste of powder anywhere in the plant, wherein there is no likelihood of insect infestation, and the need for insecticides or fumigants is eliminated, and by the use of which swirls, cores or dust holes within the bread or the bakery product and dust marks on the crust of such product are avoided.

Another object is to provide an equipment for spraying dry, ground or powdered material in a manner to form a cloud with the material therein substantially separated into individual particles, which equipment is of simple and rugged construction, having a minimum number of moving parts which are not likely to become deranged and which will operate without clogging and without escape of the material being sprayed into the atmosphere.

Another object is to provide a rounder to be used during the make-up procedure for the manufacture of bread, which rounder will readily dispense a cloud of powdered material against the surfaces thereof contacted by the dough being processed as well as against the dough pieces themselves and which facilitates removal therefrom of excess powder beyond that which adheres thereto and to the dough pieces traveling therethrough.

Although starch, such as corn starch, as a dusting medium in lieu of wheat flour, for baker's dough during processing, is known to have certain advantages, among which is that it will not support insect life, the use of starch for such purpose has not heretofore been regular commercial practice, for the reason that corn starch tends to pack, lump or agglomerate when it is attempted to sift it upon the dough pieces, so that the required even distribution of such dusting powder is not attainable.

According to one feature of the present invention, the use of starch as a dusting medium has been rendered highly practical on a commercial scale by entraining the dry starch powder in a stream of air into dusting chambers near and in communication with each of those portions or stations of the make-up equipment where dusting is required, thereby to assure uniform adhesion of such powder over the exposed surface of the dough pieces.

According to another feature, suction is effectively applied at the dusting chambers to withdraw collected air with excess of entrained powder beyond that which is taken up by the equipment and the dough pieces carried thereby; the excess powder being thus recovered for reuse.

In a preferred mode of carrying the invention into execution, dry starch powder is directed into a stream of gas, desirably air, and preferably dry air which forces such powder through conduits leading to the interior of the dusting chamber, thereby establishing a cloud of powder in such chamber, for uniform dusting with relatively fine particles of the chamber contacted by the dough pieces therein and of the dough portions themselves. The air stream in addition to entraining the powder through the conduits also draws the ambient air into the conduit effecting enhanced dispersion of the powder for more efficient dusting action.

In equipment in which the dough is subjected to the action of a rotor, as for instance in the rounder of bread-making equipment, the dough pieces may pass through an associated dusting chamber extending laterally with respect to the rounder and pass to the proofer, the suction being applied to such chamber remote from the inlet thereof.

This application is a continuation-in-part of copending application Serial No. 334,915, filed February 3, 1953 on which Patent No. 2,869,482 was issued on January 20, 1959.

In the accompanying drawings in which are shown one or more of various possible embodiments of the several features of the invention, Fig. 1 is a diagrammatic view of a portion of a conventional make-up equipment for a bread baking, Fig. 2 is a perspective view of a rounder according to the invention, Fig. 3 is a front elevational view of the duster, Fig. 4 is a detail view taken along line 4—4 of Fig. 3;

Fig. 5 is a front elevational view of the powder magazine,

Fig. 6 is a side elevational view of the powder magazine,

Fig. 7 is a view taken along line 7—7 of Fig. 6,

Fig. 8 is a detail view on an enlarged scale showing the discharge tube and ejector unit, Fig. 9 is a perspective view of the spiral rounding trough of the rounder, Fig. 10 is a perspective view of a discharge nozzle, Fig. 11 is a sectional view taken along line 11—11 of Fig. 2, and Fig. 12 is a sectional view taken along line 12—12 of Fig. 11.

Figures 3, 4:
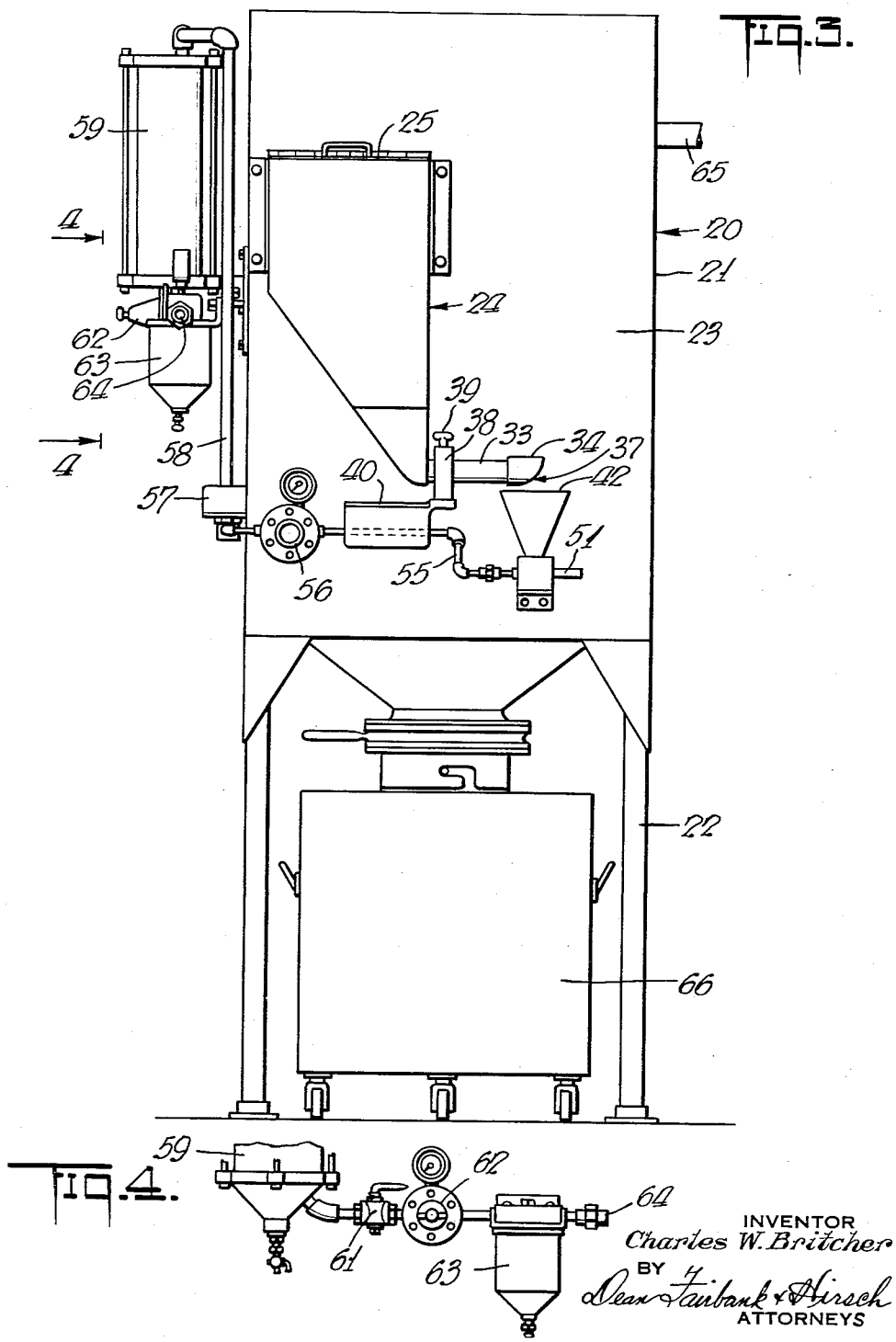

Referring now to the drawings, there is shown in Fig. 1 a portion of a generally conventional make-up equipment for bread baking. Thus, there is a divider "D" in which dough is cut into pieces for the individual loaves and delivered by a conveyor C laterally into a rounder R. The dough pieces are discharged from the rounder R onto a conveyor C' which delivers the dough pieces into an elevator E that moves successive dough pieces into a proofer P from which they are fed to subsequent stages of the make-up process before ultimate delivery to a baking oven (not shown).

In the illustrative embodiment of the invention herein shown, a duster 20 is associated with the rounder to dust the dough pieces therein processed.

As shown in Fig. 3 the duster 20 desirably comprises a substantially rectangular box-like housing 21 suitably mounted in upright position as by legs 22.

Mounted on the front panel 23 of the housing 21 and extending outwardly therefrom is a powder reservoir or hopper 24, the mouth of which has a hinged cover 25. The lower ends 26 of the front and back walls 27 of the hopper and the lower portion 28 of side wall 29 thereof taper inwardly to define substantially a funnel to facilitate discharge of powder through the port 31 leading from the hopper to the outlet in the lower end of side wall 32.

Affixed at one end in outlet port 31 which leads from the hopper is a horizontal powder discharge tube 33, the free end of which mounts a baffle member 34. As shown in Fig. 8, the baffle member is cylindrical at one end as at 35 so that it may snugly encompass the free end of tube 33, the latter abutting at its lower edge against a lip 36 extending transversely across the baffle member. The lower portion of the baffle member is a mouth 37 through which will fall the powder passing over the lip 36.

Means are provided to effect discharge of powder from magazine 24 through tube 33. To this end, a collar 38 encompasses tube 33 and is adjustably secured thereto as by set screw 39. Affixed to said collar 38 is an electrical vibrator unit 40 of well known conventional construction, one familiar form of which is marketed under the trademark "Syntron," the position of which with respect to tube 33 determining the rate of flow of powder from hopper 24.

The mouth 37 of baffle member 34 is positioned directly over the mouth 42 of a funnel 43, the lower end 44 of which is secured in the upper portion of a substantially cylindrical recess 45 in an ejector member 46. As shown in Fig. 8, the ejector member comprises a block 47 secured to a bracket 48 mounted on front panel 23 of the housing 21. The block 47 has transversely aligned bores 49, 50 in communication with the lower portion of the recess 45, the bore 50 having a nipple 51 associated therewith to which one end of a pressure line 52 may be connected. Mounted in bore 49 and extending into the recess is a nozzle 53, the outer end 54 of which is connected by line 55 through pressure regulator 56 which per se is well known, solenoid valve 57 which per se is conventional and line 58 to one end of a dehydrator unit 59 which per se is also well known. The lower end of unit 59 is connected through valve 61, pressure regulator 62 and filter 63 to a source of air under pressure at 64.

The housing 21 contains a suction device (not shown) connected to suction line 65 and the suction device through conventional filters (not shown) discharges powder drawn through line 65 in the manner hereinafter described, into a collector 66 positioned beneath the housing 21.

The pressure line 52 is connected to a fitting 67 to which branch pressure lines 68 are connected, such lines leading to the rounder R.

The rounder R, illustratively shown in Fig. 2, is of the type put out by Baker Perkins, Inc. of Saginaw, Michigan and comprises a rotor 71 illustrated as a truncated cone having its smaller diameter portion at its upper end, said cone being rotated by a suitable drive motor (not shown). Supported over the cone 71 is a spiral rounding trough 72, the lower edge 73 of which is spaced from the surface of the cone with but slight clearance. The trough 72 rises as it spirals around the cone so that its lower end 74 is at the inlet to the rounder into which the dough portions are introduced by the conveyor C (Fig. 1).

According to the invention the upper end 75 of the trough 22 is adjacent the inlet to transfer station 76 from which the rounded dough pieces are discharged from the rounder.

As shown in Figs. 2 and 11, the transfer station or chamber 76 comprises a substantially rectangular casing 77 supported by brackets 70 from the conventional flour dusting box 70' of the rounder. The lower edge 78 of casing 77 is inclined so that it is complementary to the inclination of the cone and is spaced therefrom with but slight clearance. The side walls 79, 80 of the casing 77 have transversely aligned openings 81, 82 therein, the latter defining the inlet to the transfer station. A conventional rejector bar 83 extends transversely between the walls 79 and 80 and is spaced from the cone 71 by a distance such that oversize dough pieces cannot pass thereunder, but will be guided by said bar through the opening 81 in wall 79 so that they will roll down the cone along trough 84 into box 85 to be collected for reprocessing.

The front wall 86 of the casing 77 has an opening 87 with a chute 88 extending outwardly from its lower edge and a curved cover or hood 89 extending outwardly from the upper portion of said opening 87 is affixed at its longitudinal edges to said chute 88 to define a dusting chamber 91. Desirably, the portion of chute 88 adjacent opening 87 has perforations 93 therein through which powder may fall to dust the cone 71 in the manner hereinafter described.

Affixed to the upper edge 95 of the trough 72 adjacent the end 75 thereof is one end of a bracket arm 96, the free end of which has an opening through which the threaded portion 97 of a nozzle 98 extends, said nozzle being fixed in position as by nuts 99. The lower end of the nozzle 98 desirably has an integral deflector plate 101 thereon against which the powder passing through the nozzle is directed. Desirably the nozzle 98 is connected through one of the branch pressure lines 68 and fitting 67 (Fig. 1) to pressure line 52 positioned so that the powder will be guided by the deflector plate against the portion of side wall 79 of the housing 27 between opening 81 therein and opening 87 in front wall 86 against which the dough pieces are hurled as they leave the trough 72, by the rotary movement of the cone 71.

A second nozzle 98' identical to nozzle 98 and connected to the other branch pressure line 68 desirably extends through the cover member 89 with its deflector plate 101' positioned so that it directs the powder against the dough pieces as they roll down the chute 88.

To collect excess powder which does not adhere to the dough pieces and which does not pass through the perforations 93 in the chute 88, the cover 89 has an opening 105 adjacent its outer end outwardly of nozzle 98' which is connected by conduit 65 to the source of suction (not shown) in the duster housing 21.

In the operation of the system with the nozzle 98 directed toward the side wall 79 of the transfer chamber 76 and the deflector plate 101' of the nozzle 98' directed toward the upper portion of the chute 88, the vibrator 40 is electrically energized; the source of air under pressure is applied to dehydrator unit 59 and the source of suction is connected to conduit 65.

As a result of the vibration, powder from the hopper 24 will be discharged through port 31 along the length of pipe 33. By reason of the lip 36, the powder in the pipe 33 will pile up inwardly of the lip so that powder will drop at relatively small rate over such lip into the funnel 43 therebeneath. The rate of flow of the powder may readily be controlled by adjusting the position of the vibrator unit 40. Thus, if the set screw is loosened and the collar rotated so that the axis of vibration of unit 40 is in a horizontal plane there will be a minimum flow and with the axis of vibration in a vertical plane there will be maximum flow.

As the powder falls into the funnel 43, by reason of the air jet from nozzle 53 it will be forced through outlet port 50. By reason of such air jet, a venturi action will be created which will suck such ambient air into the outlet port through the funnel 43 thereby preventing a cloud of powder forming above the funnel and providing additional air in the stream of powder and air flowing through outlet port 50 and line 52 for enhanced dispersion of the powder.

As the streams of air and powder are discharged from the nozzles 98, 98' and strike the deflector plates 101 and 101', such streams will be guided against the side wall of the transfer chamber and the upper portion of the chute respectively.

When such streams of powder and air leave the nozzles 98, 98' by reason of the expansion of the air, a cloud will be formed containing relatively small finely divided particles of powder and such cloud will fill the transfer chamber and the dusting chamber.

In practice, the dry air which delivers powder to the transfer chamber and dusting chamber is fed at rate in the order of 15 cubic feet per minute while the suction means in the casing 21 will draw at the rate in the order of 300 cubic feet per minute. Thus, the powder particles that do not adhere to the dough pieces or pass through the perforations in the chute 88 will be sucked from the interior of such chambers along with ambient air so there is no likelihood of dust escaping into the room, yet the suction will in no wise interfere with the effective and thorough dust coating of the dough pieces.

The dough pieces which are thoroughly dusted in the chamber 91 will slide down the chute 88 onto conveyor C′ to be moved into the elevator E and thence into the proofer for subsequent steps in the make-up operation.

While the methods and systems above described have certain advantages even with the use of flour as the dusting powder, including particularly the uniformity of application and the recovery of excess powder beyond that which is taken up by the dough, the maximum advantage is attained where powdered starch, desirably fine corn and preferably fine wheat starch, is used instead of flour.

Since starch does not readily wet with water, it will settle out when mixed with water. Unlike the difficulties pointed out with the use of dusting flour, a reaction occurs in the oven with the use of dusting starch, much the same as in the gelation of corn starch pudding. In addition, the action of heat, acid or ferments, all three of which occur in the oven, results in the conversion of starch into dextrin and some of its sugar derivatives. This accounts for the elimination of cores, swirls and dust holes in the baked product where starch is used as the dusting medium. Moreover the use of such dusting medium further results in an improvement of color, thinness, tenderness and uniformity of crust.

In use of the system a make-up equipment for a bread bakery would in full-capacity operation, processing in the order of 100,000 pounds of dough in twenty-four hours, consume only in the order of 125 pounds of dusting starch, that is, one-eighth of one percent by weight of the dough being processed. This is but 20 to 25 percent of the weight of dusting powder consumed, where flour rather than starch is used for the purpose.

In practice, the vibrator 40 would be adjusted so that the feed powder is at rate not greatly in excess of that actually consumed. The air pressure to nozzle 53 would ordinarily be 2 to 2.5 pounds per square inch but might be as high as 6 to 8 pounds per square inch or even higher to deliver the greater amount of starch required for effective dusting of a loose or wet dough.

A dough piece dusted by the system of the present invention becomes uniformly coated over its entire surface with substantially the thinnest possible layer of starch and substantially without excess. The dough thus becomes entirely dry to the touch and non-sticky and will not shed starch in ordinary handling. The blowing of an excessive amount of starch through the nozzles 98, 98′ would not materially increase the amount of powder applied to the dough, but would render operation more cumbersome by necessitating more frequent emptying of the collector 66.

By reason of the fact that starch does not support insect life, the use of starch as a dusting medium dispenses entirely with the need for insecticides or fumigants.

There is no need for cleaning the proofer, although it is desirable to remove the few pounds of dusting starch that may accumulate therein after some weeks of continuous operation. Such removal once every six weeks or so of continuous 24-hour use is adequate. This is to be contrasted with the need for cleaning at least weekly, resorted to where flour is used as the dusting powder.

The procedure and equipment for drawing excess starch beyond that which is taken up by the dough pieces from the dust chambers to a collector, avoids the accumulation of dust and starch throughout the make-up department and avoids respiratory difficulties to the workers since the air is not powder-laden where the present method and equipment are used.

While the invention has been described particularly in its application to the make-up equipment of a bread or roll bakery, it is understood that it applies also to sweet doughs such as biscuits, cake, pies or the like. The invention also has application in somewhat analogous relations where the food product is moist or tacky in the course of processing, as for instance for dusting marshmallows, grain pulled mints and chewing gums in the confectionery industry. It also has application to other food products, such as for dusting meats or the like with mono-sodium glutamate or similar preparations.

While one illustrative portion of conventional bread make-up equipment has been shown and described, it will be understood that the invention may be applied to other portions of such equipment as well as to equipments of any character for such general use. For any application there would be a dust chamber of the general character described at each of the locations where dusting is required, all fed from on or more sources of dusting powder and pneumatic pressure. In general, but one dusting chamber is required at each of those elements of the make-up equipment that require dusting.

As many changes could be made in the above method and equipment and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letter Patent of the United States is:

1. A bread rounder comprising a rotary conical member, a spiral trough encompassing a portion of said conical member, said trough having its inlet end adjacent the base of said rotary member and its discharge end adjacent the top thereof, a transfer chamber adjacent the upper end of said trough, said transfer chamber having an inlet in a wall thereof in communication with the discharge end of said trough, whereby upon rotation of said rotary member dough pieces will ride up said trough and be discharged into said transfer chamber, said transfer chamber having a discharge chute in communication at one end with the interior of said transfer chamber and extending outwardly therefrom, a hood encompassing said discharge chute defining a dusting chamber, said dough pieces sliding down said chute through said dusting chamber, means to eject a stream of gas and powder into said dusting chamber to form a cloud of powder therein and means to provide a suction to said dusting chamber to remove excess of powder beyond that which adheres to the dough pieces passing therethrough.

2. The combination recited in claim 1 in which means are provided to direct a mixture of gas and powder against the wall of said transfer chamber opposed to the inlet.

3. The combination recited in claim 1 in which a discharge nozzle is affixed to the spiral trough adjacent its discharge end, and means on said nozzle to direct a stream of gas and powder therefrom through the inlet of said transfer chamber against the opposed wall of said transfer chamber.

4. The combination recited in claim 1 in which the means to eject a stream of gas and powder into said dusting chamber comprises a discharge nozzle in said dusting chamber between the ends thereof, said nozzle having means at its inner end to direct the stream of gas and powder therefrom toward the end of said dusting chamber adjacent the transfer chamber.

5. The combination recited in claim 1 in which the means to eject a stream of gas and powder into said dusting chamber comprises a discharge nozzle in said dusting chamber between the ends thereof, said nozzle having means at its inner end to direct the stream of gas and powder therefrom toward the end of said dusting chamber adjacent the transfer chamber, and a second discharge nozzle is provided affixed to the spiral trough adjacent its discharge end, and means on said second nozzle to direct a stream of gas and powder therefrom through the inlet of said transfer chamber against the opposed wall of said transfer chamber.

6. The combination recited in claim 1 in which the discharge chute has perforations therethrough adjacent the transfer chamber.

7. Dusting equipment comprising a powder reservoir having an outlet at its lower end and a discharge tube extending laterally from said outlet, an ejector unit positioned below the free end of said tube, said ejector unit comprising a member having a recess therein vertically aligned with the free end of said tube, a nozzle extending transversely into said recess, said recess having an outlet port transversely aligned with said nozzle, means to discharge a stream of powder from said reservoir through said tube to drop into said recess between the nozzle and the outlet port, whereby when gas under pressure is applied to said nozzle, a mixture of such gas and entrained powder will be blown through said outlet port.

8. The combination set forth in claim 7 in which a funnel is provided having its discharge end positioned in said recess and its mouth positioned below the free end of said tube and spaced therefrom.

9. The combination set forth in claim 7 in which a baffle member is associated with the free end of said tube, said baffle member including a lip rising from the lower portion of such free end whereby the powder flowing through such tube will be backed up therein by such lip.

10. The combination recited in claim 7 in which the means to discharge a stream of powder from said powder reservoir comprises a vibrator unit in operative relation with said tube near the lower end of said powder reservoir.

11. The combination recited in claim 7 in which the means to discharge the stream of powder comprises a collar encompassing said tube and adjustably secured thereto and a vibrator unit carried by said collar.

12. The combination recited in claim 7 in which the reservoir comprises a box-like chamber having a substantially rectangular upper portion and having the outlet at the lower end of one of the walls thereof and having the lower portions of the other walls tapering inwardly toward the outlet.

References Cited in the file of this patent

UNITED STATES PATENTS

| | | |
|---|---|---|
| 903,584 | Kohler | Nov. 10, 1908 |
| 1,283,512 | Herr | Nov. 5, 1918 |
| 1,401,795 | Kohler et al. | Dec. 27, 1921 |
| 1,661,775 | Streich | Mar. 6, 1928 |
| 1,910,536 | Guggenheim | May 23, 1933 |
| 2,028,410 | Rapisarda | Jan. 21, 1936 |
| 2,047,430 | Plambeck | July 14, 1936 |
| 2,331,510 | Schiff | Oct. 12, 1943 |
| 2,451,096 | Kooman | Oct. 12, 1948 |
| 2,505,243 | Hewitt et al. | Apr. 25, 1950 |
| 2,614,528 | Britcher | Oct. 21, 1952 |
| 2,642,821 | Hettinger | June 23, 1953 |

OTHER REFERENCES

Corn Starch Dusting, The Bakers Digest, June 1953, pages 33 and 34.